July 25, 1944.  R. A. THOMPSON  2,354,411
APPARATUS FOR MACHINING SPIRAL GROOVES
Filed Dec. 30, 1937  3 Sheets-Sheet 1
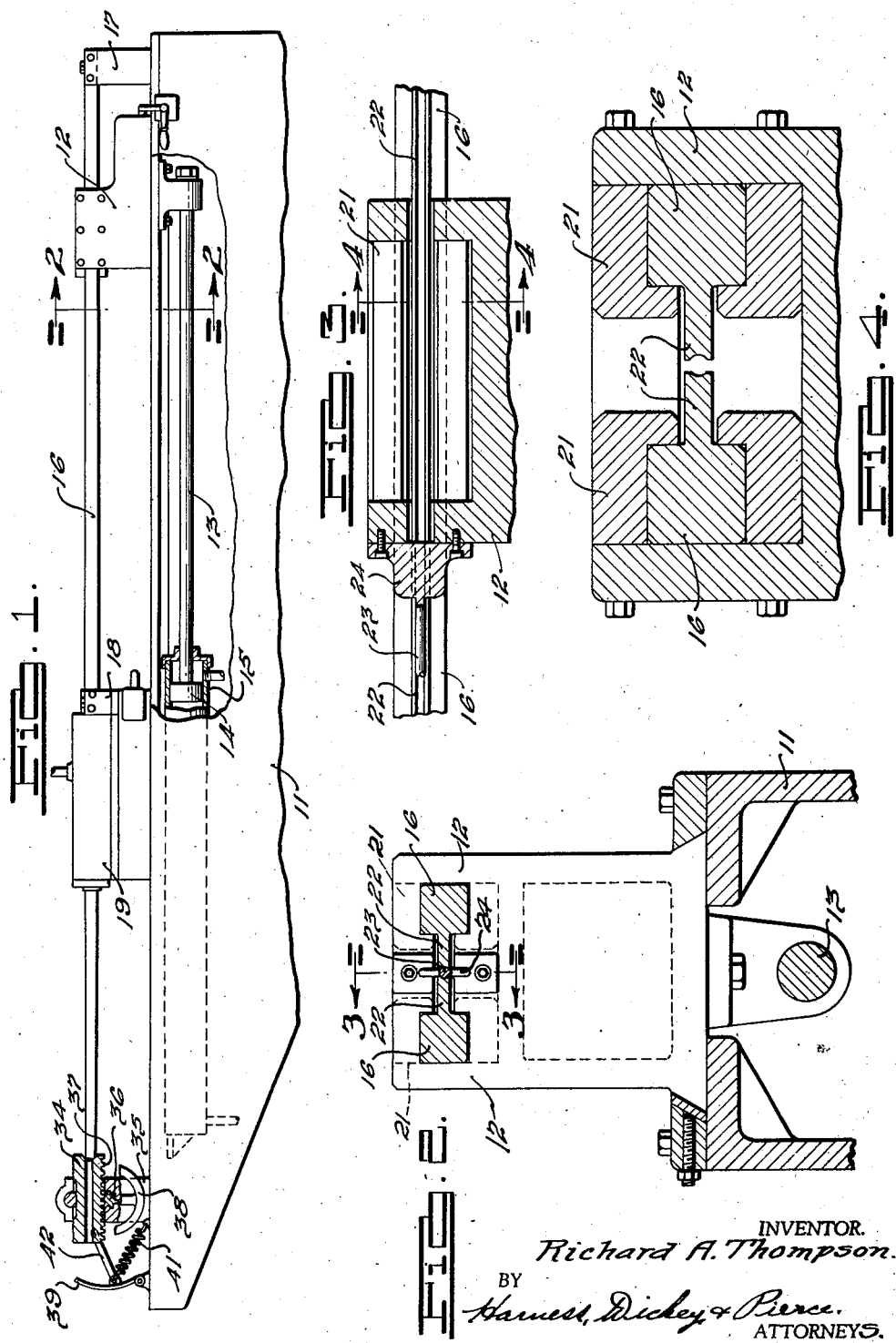
INVENTOR.
Richard A. Thompson.
BY
Harness, Dickey & Pierce.
ATTORNEYS.

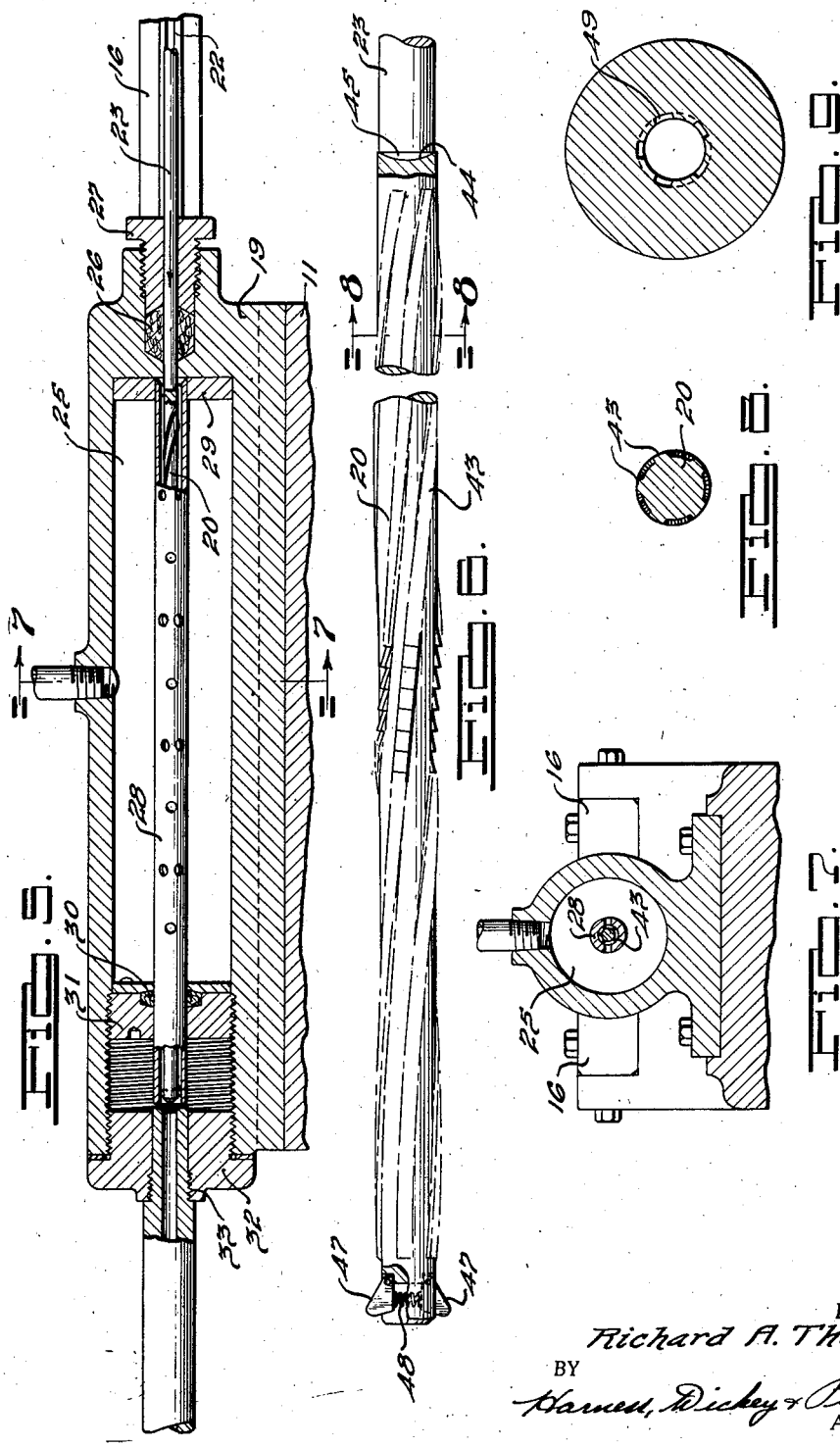

July 25, 1944.  R. A. THOMPSON  2,354,411
APPARATUS FOR MACHINING SPIRAL GROOVES
Filed Dec. 30, 1937  3 Sheets-Sheet 3
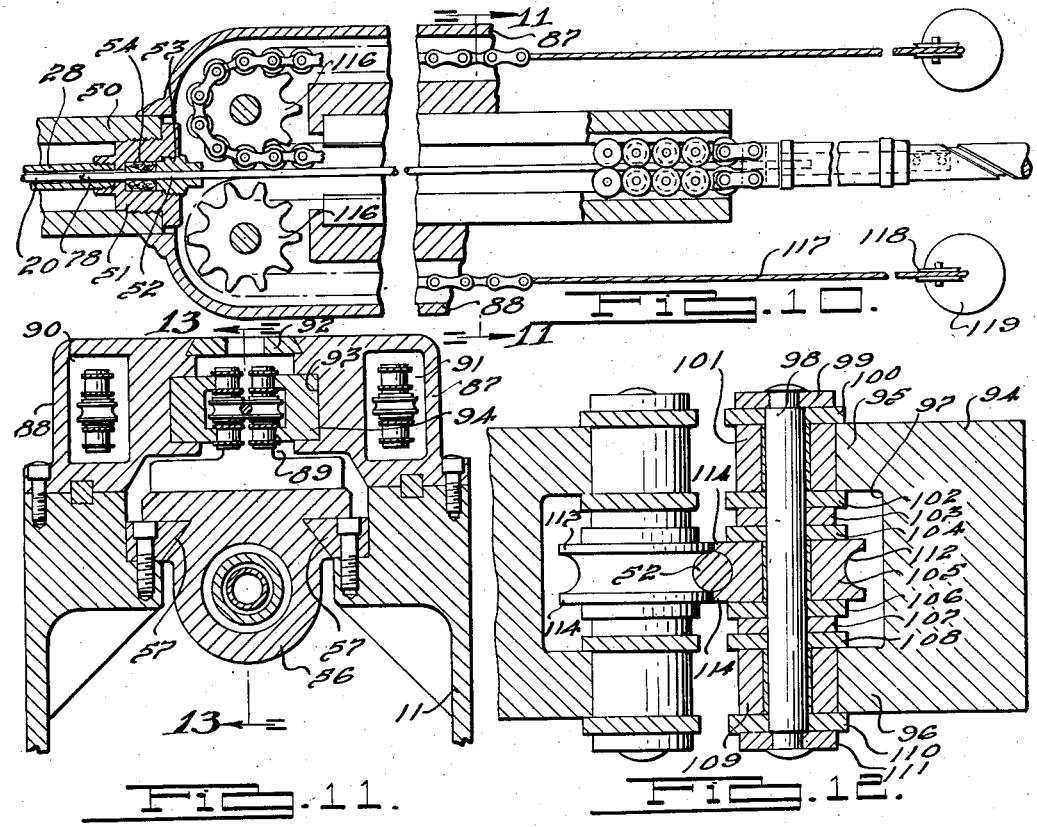
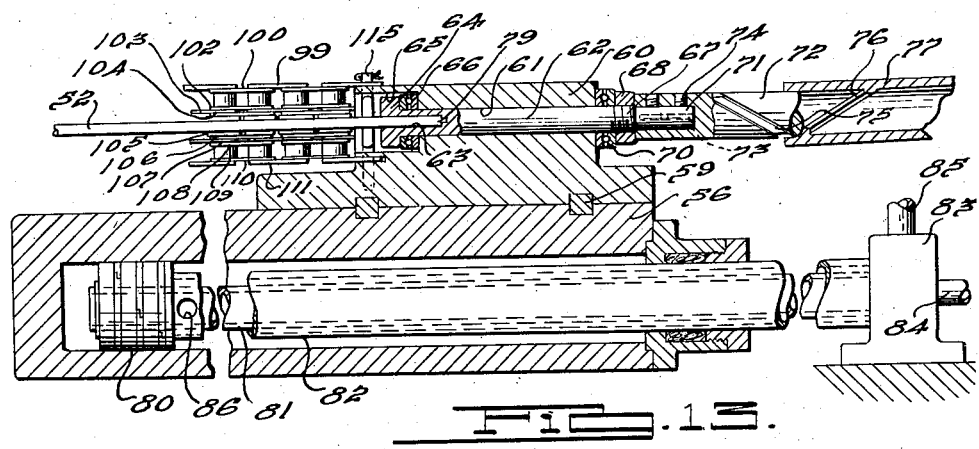
INVENTOR
Richard A. Thompson.
BY
Harness, Dickey & Pierce.
ATTORNEYS.

Patented July 25, 1944

2,354,411

UNITED STATES PATENT OFFICE 2,354,411

APPARATUS FOR MACHINING SPIRAL GROOVES

Richard A. Thompson, Detroit, Mich., assignor to Colonial Broach Company, Detroit, Mich., a corporation of Delaware Application December 30, 1937, Serial No. 182,549

9 Claims. (Cl. 90—28.1)

My invention relates to broaching machines, and particularly to a machine for accurately broaching spiral grooves in a work piece to provide lands therebetween.

My invention pertains particularly to a means for broaching spiral grooves in a gun barrel to provide spiral lands and grooves therein which are accurately shaped and spaced from each other throughout the length of the barrel. When machining grooves in gun barrels heretofore, it has been the practice to employ a single tool which operated to machine a single groove in the gun barrel each passage of the tool therethrough. The tool was indexed as each slot was cut therein and difficulty was always experienced in obtaining uniform widths and spacing of the lands throughout the length of the barrel. Such uniform disposition of the lands is essential in gun barrels in view of the fact that an impression of the land and groove is made in the projectile immediately upon its entrance into the barrel and which entirely fills the grooves of the barrel to form a gas seal therewith. If at any point throughout the length of the barrel the width and spacing of the lands and grooves vary, the projectile will be distorted and the gas would leak past the deformed portion.

In practicing my present invention, I provide a broach having accurately disposed spiral rows of teeth of predetermined width and varying height, so constructed as to machine uniform grooves throughout the length of the gun barrel which will be exactly similar to grooves in depth, spacing and width with grooves machined in similar gun barrels. This uniformity is to be desired and is readily obtained when employing my broaching tool. The faces of the teeth are disposed on a helical lead at right angles to the lead of the rows of teeth so that similar cutting edges will be provided on either side of the teeth faces. The broach is short in length and preferably has provided on its front end means for preventing its insertion in the receiving chamber and on its rear end, a socket for receiving the end of a push rod to form a ball and socket connection therewith which permits the turning of the broach independent of the push rod.

The machine for effecting the broaching operation has a bed provided with a reciprocable head engaging a push rod which is guided upon a pair of bars which pass through the head and which are accurately aligned with the broach receiving chamber. The end of the push rod is sealed into the chamber, preferably by a packing gland, and is accurately aligned with the aperture in the gun barrel. The gun barrel is preferably mounted on the broach receiving chamber in the same manner that it is secured to the gun receiver while the front end is preferably accurately supported aligned with the push rod by a cone shaped clamp which engages the front peripheral edge of the barrel. The broaching chamber is provided with an orifice into which a coolant such as soda, oil and the like, is introduced under pressure. The coolant under pressure is forced about the broach through the gun barrel to break off the fine chips and carry them from the barrel. A suitable deflector is provided beyond the front clamp which deflects the coolant into a reservoir provided in the base of the machine. The broach having teeth with like cutting edges on both sides and having a slow lead, that is to say, having a helical lead of small angle, will be turned by the teeth as it is being pushed through the gun barrel by the push rod in the presence of the ball and socket connection therebetween.

Accordingly, the main objects of my invention are to provide a broach for machining accurate grooves in gun barrels or like articles; to provide a machine with a guided push rod for forcing a separate broach through a tubular element; to seal a push rod in a chamber for receiving the broach and for supporting a tubular work element in alignment with the broach and push rod; to deliver a coolant under pressure to a broach receiving chamber which flows over and ahead of the broach and breaks off and washes chips from the work piece; to provide a connection between the push rod and broach which permits the broach to freely turn independent of the push rod; to provide means on the front end of the broach to prevent the front end from being inserted in the broach receiving chamber; and in general, to provide a broach, apparatus and means for accurately machining grooves in a tubular element which is simple in construction, positive in operation, and economical of manufacture.

Other objects and features of novelty of my invention will be specifically pointed out or will become apparent when referring for a better understanding of my invention to the following description, taken in conjunction with the accompanying drawings, wherein:

Figure 1 is a broken view, in elevation, of a broaching machine embodying features of my invention;

Fig. 2 is an enlarged sectional view of the structure illustrated in Fig. 1, taken on the line 2—2 thereof;

Fig. 3 is a broken sectional view of the structure illustrated in Figure 2, taken on the line 3—3 thereof;

Fig. 4 is an enlarged sectional view of the structure illustrated in Fig. 3, taken on the line 4—4 thereof;

Fig. 5 is an enlarged sectional view of the broach receiving chamber illustrated in Fig. 1;

Fig. 6 is an enlarged broken view, with parts in section, of the broach illustrated in the broach receiving chamber of Fig. 5;

Fig. 7 is a sectional view of the structure illustrated in Fig. 5, taken on the line 7—7 thereof;

Fig. 8 is a sectional view of the structure illustrated in Fig. 6, taken on the line 8—8 thereof, and Fig. 9 is a section of the finished barrel taken normal to its axis.

Fig. 10 is a side elevational view, partly in cross-section, of a machine constructed according to another form of the invention;

Fig. 11 is a cross-sectional view taken substantially along the line 11—11 of Fig. 10;

Fig. 12 is a sectional view on a larger scale, showing the manner in which the chain cooperates with the push rod; and Fig. 13 is a cross-sectional view taken substantially along the line 13—13 of Fig. 11.

Referring to Fig. 1, I have illustrated a broaching machine embodying a base 11 having a movable head 12 supported thereon. The head is herein illustrated, as being connected to a pull rod 13 secured to a piston head 14 operating in a hydraulic cylinder 15. The head 12 is reciprocated through the operation of the piston in the cylinder in a well known manner and will not be further described. Other means besides the hydraulic mechanism may be employed for operating the head 12 such as a lead screw, a rack and pinion or other well known device capable of producing a motion in reciprocation.

A pair of guide bars 16 are supported on the bed, the right hand ends, as viewed in Fig. 1 being supported on uprights 17 while the left ends are supported by the projections 18 on the chamber casting 19. The guide bars 16 are accurately located in the head 12 on guide elements 21 which have bearing engagement with the top, bottom and outer sides of the guide bars.

The guide bars 16 are provided on their inner face with projecting tongues 22, the inner surface of which are accurately shaped to engage a push rod 23. The push rod is integral with an element 24 which is secured to the head 12 and which slides between the tongues 22 of the guide bars 16. During the movement of the head 12, any sag in the bars will be taken up by the guide elements 21 so as to retain them accurately aligned in position when supporting the push rod 23 as it is being moved forwardly or backwardly by the head 12.

The push rod 23 projects into the chamber 25 of the chamber casting 19 and leakage of fluid around the rod is prevented by a packing gland 26 which is retained in position by a clamping element 27. The chamber supports a broach receiving tube 28 having one end disposed in a bushing 29 accurately aligned with the end of the push rod 23. The opposite end of the tube is supported by a collar 31 which is screwed into the threads provided on the inner surface of the chamber 25. A suitable packing element 30 may be employed to effectively seal the collar to the broach receiving tube 28.

A work supporting cap 32 is also secured by the threads in the inner wall of the chamber 25 and is provided with a central aperture 33 aligned with the broach receiving element 28. The central aperture 33' is shaped and machined to receive the end of the gun barrel in the same manner that it is held by the receiver. In this manner, the barrel is supported exactly aligned with the broach receiving element 28 and the broach 20.

The opposite end of the barrel is supported by an engaging element 34 having a conical end which engages the peripheral end of the barrel. The element 34 is mounted in a head 35 for movement in reciprocation toward and away from the barrel produced by a pinion 36 operated by a wheel 38 to rotate relative to a plurality of teeth 37 on the element. The element 34 is provided with an aperture which permits the broach 20 to pass from the end of the gun barrel. The fluid forced into the chamber 25 also passes from the end of the gun barrel and through the supporting element 34 where it engages a deflector 39 and flows into the bottom of the base 11. The deflector 39 is connected by a link 42 to the head 34 and is moved out of the position illustrated when the wheel 38 is operated to permit the removal of the broach. The deflector 39 will be moved into the position illustrated when the element 34 is moved into barrel engaging position. A suitable spring 41 may be employed to counteract the weight of the deflecting element.

In Fig. 6, the broach 20 is illustrated enlarged as being provided with a plurality of helical rows of teeth 43. The rows of teeth machine grooves in the inner surface of the gun barrel leaving lands disposed therebetween. The rear end of the broach is provided with a concave recess 44 for receiving the convex end 45 of the push rod 23. This arrangement provides a ball and socket connection which permits the broach to readily turn independent of the push rod 23.

The opposite end of broach 20 is provided with fingers 47 which are bowed outwardly by springs 48. The end faces of the fingers 47 project outwardly sufficiently to engage the end of the broach receiving element 28 to prevent this end of the broach from being inserted therein. When the broach is pushed from the tube 28, the fingers 47 are collapsed so that they will move into the barrel.

After a barrel has been broached, the broach is removed from the supporting element 34 which is then moved out of engagement with the barrel which is then removed. The broach is inserted in the broach receiving element 28 and a new barrel is secured to the cap 32 and accurately positioned by the element 34. The head 12 is then moved towards the chamber 19 causing the push rod 23 to move the broach through the rifle barrel. During the broaching operation a coolant under pressure is delivered to the chamber 19 and forced through the apertures in the tube 28. The coolant flows over the broach and through the rifle barrel breaking off the fine chips and washing them from the barrel out through the support 34 where it is directed by the deflector 39 into the base 11. In view of the ball and socket connection between the broach and push rod, the broach 20 will turn following the lead of the helically disposed rows of teeth on the broach. In Fig. 8, I have illustrated a section of the broach to disclose the rows of teeth 43 and their relation to the grooves in the gun barrel, a section of which is illustrated in Fig. 9. The broach will produce like sections at all points throughout the length of the barrel and will provide similar lands and grooves in all like gun barrels.

With respect to the form of the invention shown by Figures 10 to 13, inclusive, the difference between this arrangement and that previously described resides principally in the means for controlling and moving the push rod. Generally, coolant is introduced along the broach and into the gun barrel in the same manner, and for this reason this part of the arrangement largely has been omitted in the drawings.

Referring now particularly to Figure 10, the broach is indicated by the same numeral 20, the apertured tube around the broach is indicated by the same numeral 28, while the chamber casting for the coolant, and which corresponds to the casting 19, is indicated at 50. The right end of the tube 28 is threaded into a head 51 that is in turn threaded into the right end of the casing 50 and the head is apertured to allow a push rod 52 to pass therethrough and engage the end of the broach 20. For preventing coolant from escaping past the push rod, a plug 53 and packing 54 are provided in the head 51, as will be readily understood.

For the purpose of reciprocating the push rod 52, an arrangement is provided which, as best shown by Figure 11, includes a cylinder 56 mounted for reciprocation on guide 57 of the base 11 of the machine. This cylinder, as shown by Figure 13, is transversely keyed, as indicated at 59, to a block 60, which is adapted to reciprocate with the cylinder. The block 60 is longitudinally apertured as indicated at 61, and this aperture receives a pin 62 which at its left end has a relatively short, central opening 63 receiving the end of the push rod 52. At its left end, the pin 62 has a head 64 disposed in a larger opening 65 in the left end of the block 60, and this head engages a thrust bearing 66 likewise disposed in the opening 65. The opposite end of the pin 62 has a threaded portion 67 for receiving a nut 68 and the latter engages a second thrust bearing 70 disposed against the end of the block. It will be appreciated that this arrangement locks the pin 62 to the block 60 for axial movement therewith, while at the same time the pin can be easily turned about its own axis and with respect to the block.

Beyond the threaded portion 67 of the pin, the latter has an extension 71 which projects into an opening in a guide bar 72. This part of the pin is keyed to the guide bar, as indicated at 73, and set screws 74 lock the two together against axial separation. It may be mentioned here that the guide bar 72 is provided with spiral grooves 75, which engage a similarly arranged rib 76 in a stationary guide tube 77, so that during reciprocation of the guide bar, it is turned.

From the foregoing, it should be clear that when the block 60 moves to the left, the guide bar 72 and the pin will turn and the turning may be synchronized with the natural turning of the broach occurring as the latter moves through the gun barrel. While the push rod might normally be turned by frictional contact at its ends with the broach and pin 62, it is preferred to positively lock the broach, rod and pin together so that turning of the pin positively, in turn effects positive turning of the broach. This may be effected by providing a screw head screw driver type lock 78 between the end of the broach and the end of the push rod and a similar lock 79 between the end of the push rod and the pin 62.

For reciprocating the cylinder 56, a piston 80 is provided therein, and this piston is mounted on a piston rod which comprises an inner tube 81 and an outer tube 82 that project to one end of the cylinder. Beyond the ends of the cylinder, the tubes 81 and 82 are fastened in a block 83 and are connected respectively to conduits 84 and 85 leading thereto. These conduits extend to a suitable valve, which, when operated in one manner, causes fluid under pressure to flow through one conduit and allow fluid to exhaust from the other, and when reversed in operation causes the first conduit to be opened to exhaust and the second conduit to be opened to fluid under pressure. It will be noted that the tube 81 extends to the left side of the piston and is open to this side so that fluid may be conducted to and exhausted from this side of the piston while the tube 82 has a radial opening 86 allowing fluid to be conducted to and exhausted from the right side of the piston. It should thus be apparent that by operation of the valve, fluid under pressure may be conducted to one side of the piston or the other, depending upon the valve operation, and that fluid at the opposite side of the piston may be exhausted. Since the piston and tubes are stationary, the movement that will result will be a movement of the cylinder 56.

All of the foregoing relates to the manner in which the push rod is moved and the means for accomplishing this movement. Since the push rod, however, is small in diameter, it is desirable to support it, as previously explained, and the improved means for guiding and supporting the push rod while permitting its turning will now be described.

Referring to Figures 10 and 11 particularly, castings 87 and 88 are mounted on the upper side of the base 11, and these are constructed and arranged to provide a central, longitudinal passageway 89, and side passageways 90 and 91. These passageways or chambers are open at both ends of the casting, and the central passageway 89 receives the upper part of the block 60 so that the latter may reciprocate therein. A key plate 92 engages both of the castings 88 and 87 at the upper side of the passageway 89, so as to rigidly connect the castings at the center. At the sides of the passageway 89, each of the castings has a channel groove 93 which slidably receives a chain engaging block 94. As best shown by Figure 12, each of the chain engaging blocks 94 has upper and lower legs 95 and 96 and a passageway 97 between such legs, and these are adapted to cooperate with one of the chains, as presently will be seen.

Referring to Figures 12 and 13, each chain comprises pivot pins 98 assembled with an upper line of links 99 and 100, rollers 101 below the latter, a line of links 102, 103, and 104 below the rollers 101, rollers 105 below links 104, then a line of links 106, 107, and 108, rollers 109, and a line of links 110 and 111. The rollers 101 and 109 have rolling contact with the legs 95 and 96 of block 94 while the links 100 and 102 and the links 108 and 110, respectively embrace legs 95 and 96 and guide, as well as vertically support the chain. Roller 105 is grooved peripherally, as indicated at 112, and the grooves in the rollers 105 of both chains provide a cylindrical passageway or guideway for the push rod 52. It may be noted here that cylindrical flanges 113 and 114 are provided on each roller 105 at the sides of the groove and that the rollers substantially contact through these flanges.

As shown by Figure 13, the end links 99 and 111 straddle the end of the block 60 and are connected thereto by means of a pin 115. Thus, when the block 60 is moving rearwardly, the chain devices are pulled along with it.

As best shown by Figures 10 and 11, the chains at the left end pass over sprocket wheels 116 and then rearwardly through the passageways 90 and 91. At the rear ends, the chains are connected to cables 117 that pass over pulleys 118 and are connected to counter weights 119. Thus, during forward movement of the block 60, the counter weights pull the chain along with the block and then upon rearward movement of the block 60, the block itself pulls the chains and raises the counter weights.

From the foregoing description it will be apparent that the arrangement shown by Figures 10 to 13 provides a moving guideway for the push rod which is in the form of chains that travel with the rod and thereby eliminate any sliding friction during the broaching operation. Moreover, this guideway permits turning of the push rod without appreciable friction. Again it is apparent that the arrangement provides a means for positively turning the push rod in synchronism with the turning of the broach and for turning of the push rod and broach positively.

While I have described and illustrated more than one embodiment of my invention, it will be apparent to those skilled in the art that various changes, omissions, additions, and substitutions may be made therein without departing from the spirit and scope of my invention, as set forth in the following claims.

What is claimed is:

1. A machine for cutting helical grooves in a tubular element, including, in combination, a push rod, a support for a broach aligned therewith, a broach having an abutting engagement only with said push rod, a projecting finger on the one end of the broach which prevents its wrong disposition on the work support, and means for supporting a work piece aligned with said broach.

2. A broaching machine including, in combination, a reciprocable head, a work support, guide bars extending through said head, a push rod carried by said head, and tongues on said guide bars engaging said push rod for accurately aligning the rod relative to said work support as the rod is moved relative to the bars.

3. A machine for advancing a cutting tool through a tubular member, comprising a push rod for so advancing the tool, means for advancing said rod, and means including grooved rollers for guiding and supporting the push rod as it is advanced.

4. A machine for advancing a cutting tool through a tubular member, comprising a push rod for so advancing the tool means for pushing said rod, and means including chains engaging opposite sides of the push rod for guiding and supporting the push rod as it is being pushed.

5. A machine for advancing a cutting tool through a tubular member, comprising a push rod for so advancing the tool means for pushing said rod, and means including chains having grooved rollers engaging opposite sides of the push rod for guiding and supporting the push rod as it is being pushed.

6. A machine for advancing a cutting tool through a tubular member, comprising a push rod for so advancing the tool, means engaging the rod for advancing it into the member, flexible devices movable with said means and engaging opposite sides of the push rod between said means and the tubular member for guiding and supporting the rod, and means for allowing portions of said devices to progressively move away from the rod as said means approaches the tubular member so as to compensate for the decrease in length of push rod projecting from the tubular member.

7. A machine for advancing a cutting tool through a tubular member, comprising a push rod for so advancing the tool, means engaging the rod for advancing it into the member, flexible devices movable with said means and engaging opposite sides of the push rod between said means and the tubular member for guiding and supporting the rod, and means for allowing portions of said devices to progressively move away from the rod as said means approaches the tubular member so as to compensate for the decrease in length of push rod projecting from the tubular member, said flexible devices comprising chains on oposite sides of the push rod.

8. In a machine for broaching spiral grooves in the interior of a cylindrical member, a support for the member to be broached, a closed broach receiving chamber in communication with one end of said cylindrical member when the latter is mounted in said support, means to advance a broach on its cutting stroke from a position within said chamber through said cylindrical member from said one end of the cylindrical member to the other, and means for supplying fluid under pressure to said chamber to fill the chamber and cause a flow of fluid in the direction of movement of the broach through the cylindrical member during the cutting stroke.

9. In a machine for broaching rifle grooves in a gun barrel, a closed chamber adopted to receive a broach and having an opening at one end, means for supporting a gun barrel with one end in communication with said opening, means to advance a rifling broach on its cutting stroke from a position within said chamber through said barrel, and means for supplying fluid under pressure to said chamber to fill the chamber and cause a flow of fluid through the barrel in the direction of movement of the broach during the cutting stroke.

RICHARD A. THOMPSON.